(12) United States Patent
Schreier

(10) Patent No.: US 11,091,091 B2
(45) Date of Patent: *Aug. 17, 2021

(54) LIGHTING DEVICE FOR A VEHICLE

(71) Applicant: Bayerische Motoren Werke Aktiengesellschaft, Munich (DE)

(72) Inventor: Peter Schreier, Munich (DE)

(73) Assignee: Bayerische Motoren Werke Aktiengesekkschaft, Munich (DE)

( * ) Notice: Subject to any disclaimer, the term of this patent is extended or adjusted under 35 U.S.C. 154(b) by 179 days.

This patent is subject to a terminal disclaimer.

(21) Appl. No.: 16/152,587

(22) Filed: Oct. 5, 2018

(65) Prior Publication Data

US 2019/0039514 A1 Feb. 7, 2019

Related U.S. Application Data

(63) Continuation of application No. PCT/EP2017/056608, filed on Mar. 21, 2017.

(30) Foreign Application Priority Data

Apr. 6, 2016 (DE) ..................... 10 2016 205 685.9

(51) Int. Cl.
*B60Q 3/64* (2017.01)
*B60Q 3/54* (2017.01)
(Continued)

(52) U.S. Cl.
CPC ............. *B60Q 3/64* (2017.02); *B60Q 3/217* (2017.02); *B60Q 3/54* (2017.02); *G02B 6/0001* (2013.01);
(Continued)

(58) Field of Classification Search
CPC ........ B60Q 3/64; B60Q 2500/10; B60Q 3/74; B60Q 3/745; B60Q 3/76; B60Q 3/54; B60Q 3/217; G02B 19/0028; G02B 6/0001
(Continued)

(56) References Cited

U.S. PATENT DOCUMENTS 5,678,914 A 10/1997 Dealey et al.
6,594,417 B1 7/2003 Hulse
(Continued)

FOREIGN PATENT DOCUMENTS

CN 101501540 A 8/2009
CN 102128380 A 7/2011
(Continued)

OTHER PUBLICATIONS

International Search Report (PCT/ISA/210) issued in PCT Application No. PCT/EP2017/056608 dated Jun. 7, 2017 with English translation (six (6) pages).
(Continued)

Primary Examiner — Andrew J Coughlin
Assistant Examiner — Jessica M Apenteng
(74) Attorney, Agent, or Firm — Crowell & Moring LLP

(57) ABSTRACT

A lighting device for a vehicle includes a light source and a linear light emission element for emitting light, which is supplied by the light source via a coupling surface of the light emission element in the light emission element. A light conductor element is provided for distributing and/or directing light, which is supplied by the light emission element in the light conductor element. The lighting device is characterized in that the light source is linear and is arranged so as to extend parallel to the light emission element so that light
(Continued)

from the light source can be coupled to a longitudinal side of the light-emitting element in an in-coupling surface in the light emission element.

20 Claims, 2 Drawing Sheets

(51) Int. Cl.
  *B60Q 3/217* (2017.01)
  *G02B 19/00* (2006.01)
  *F21V 8/00* (2006.01)
(52) U.S. Cl.
  CPC ...... *G02B 19/0028* (2013.01); *B60Q 2500/10* (2013.01)
(58) Field of Classification Search
  USPC .......................................... 362/511
  See application file for complete search history.

(56) References Cited

U.S. PATENT DOCUMENTS

| | | | |
|---|---|---|---|
| 7,264,367 | B2 | 9/2007 | Hulse |
| 7,575,499 | B2 | 8/2009 | Tufte |
| 8,322,883 | B2 | 12/2012 | Cleaver et al. |
| 8,920,006 | B2 * | 12/2014 | de Lamberterie .... F21S 41/322 362/511 |
| 9,033,565 | B2 | 5/2015 | Pfeil et al. |
| 10,088,118 | B2 * | 10/2018 | Naron ..................... F21S 43/40 |
| 2010/0027256 | A1 | 2/2010 | Kinoshita |
| 2010/0142226 | A1 | 6/2010 | Vogt et al. |
| 2011/0170304 | A1 | 7/2011 | Fujita |
| 2013/0148373 | A1 | 6/2013 | Bayersdorfer et al. |
| 2014/0321139 | A1 * | 10/2014 | Bungenstock .......... F21S 41/10 362/511 |
| 2015/0219827 | A1 | 8/2015 | Kim et al. |
| 2015/0298604 | A1 | 10/2015 | Pfeil et al. |
| 2015/0331169 | A1 | 11/2015 | Jang et al. |
| 2016/0312973 | A1 | 10/2016 | Brosinger et al. |
| 2019/0039513 | A1 * | 2/2019 | Mueller .................. F21S 43/14 |

FOREIGN PATENT DOCUMENTS

| | | |
|---|---|---|
| CN | 104121530 A | 10/2014 |
| DE | 10 2010 012 745 A1 | 9/2011 |
| DE | 10 2010 030 660 A1 | 12/2011 |
| DE | 20 2010 010 756 U1 | 1/2012 |
| DE | 10 2012 015 057 A1 | 1/2014 |
| DE | 10 2012 106 481 A1 | 1/2014 |
| DE | 10 2012 220 696 A1 | 5/2014 |
| DE | 10 2013 104 169 A1 | 10/2014 |
| DE | 10 2013 104 174 A1 | 10/2014 |
| DE | 10 2013 021 086 A1 | 6/2015 |
| EP | 1 101 655 A2 | 5/2001 |
| EP | 2 143 991 A2 | 1/2010 |
| EP | 2 530 372 A1 | 12/2012 |
| EP | 2 530 503 A1 | 12/2012 |

OTHER PUBLICATIONS

German-language Written Opinion (PCT/ISA/237) issued in PCT Application No. PCT/EP2017/056608 dated Jun. 7, 2017 (five (5) pages).
German-language Search Report issued in counterpart German Application No. 10 2016 205 685.9 dated Dec. 16, 2016 with partial English translation (11 pages).
International Search Report (PCT/ISA/210) issued in PCT Application No. PCT/EP2017/056606 dated May 19, 2017 with English translation (five (5) pages).
German-language Written Opinion (PCT/ISA/237) issued in PCT Application No. PCT/EP2017/056606 dated May 19, 2017 (six (6) pages).
German-language Search Report issued in counterpart German Application No. 10 2016 205 684.0 dated Aug. 6, 2016 with partial English translation (10 pages).
Chinese-language Office Action issued in Chinese Application No. 201780006307.4 dated Feb. 21, 2020 with English translation (14 pages).
Chinese-language Office Action issued in Chinese Application No. 201780006408.1 dated Oct. 30, 2020 with English translation (14 pages).
Chinese-language Office Action issued in Chinese Application No. 201780006307.4 dated Jan. 26, 2021 with English translation (nine (9) pages).

* cited by examiner

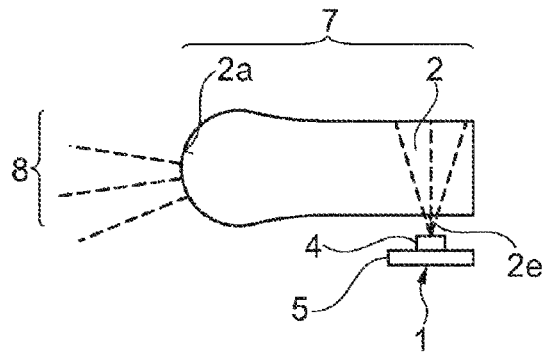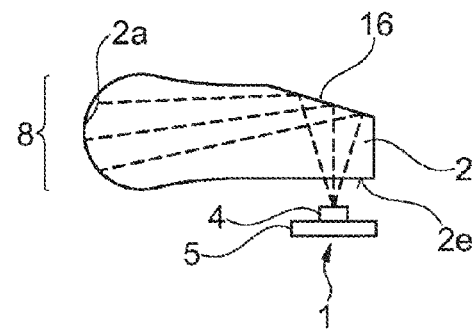
Fig. 3A          Fig. 3B
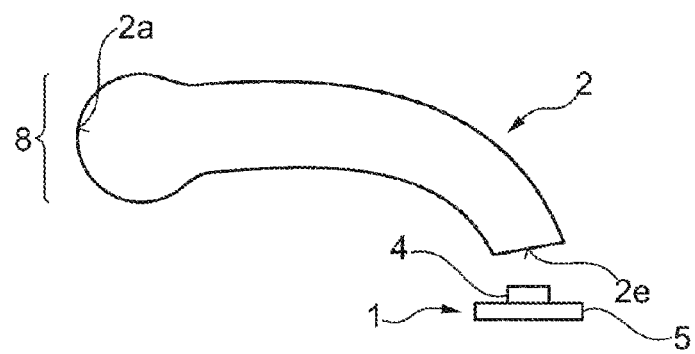
Fig. 3C
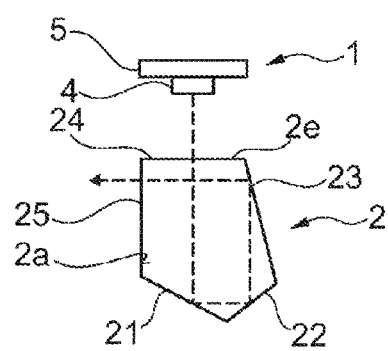
Fig. 3D

LIGHTING DEVICE FOR A VEHICLE

CROSS REFERENCE TO RELATED APPLICATIONS

This application is a continuation of PCT International Application No. PCT/EP2017/056608, filed Mar. 21, 2017, which claims priority under 35 U.S.C. § 119 from German Patent Application No. 10 2016 205 685.9, filed Apr. 6, 2016, the entire disclosures of which are herein expressly incorporated by reference.

This application contains subject matter related to U.S. application Ser. No. 16/152,570, entitled "LIGHTING DEVICE FOR A VEHICLE," filed on even date herewith.

BACKGROUND AND SUMMARY OF THE INVENTION

The invention relates to a lighting device for a vehicle, comprising a light source, a line-shaped light emission element for emitting light which is input into the light emission element by the light source via an input coupling surface of the light emission element, and a light guide element for distributing and/or directing light which is input into the light guide element by the light emission element. The invention furthermore relates to an interior design piece.

It is known to use contour line illumination for the interior illumination of a vehicle, which primarily has the purpose of accent illumination.

DE 10 2010 030 660 A1 discloses an interior design piece for a vehicle, comprising a light guide, supplied by a light source, for emitting light, and a stripe-shaped light guide element. The light guide element has a first and a second surface, wherein the first surface is one of the two largest surfaces of the light guide element. The second surface is a surface that differs therefrom and comprises an input coupling surface. The light guide element and the light guide are arranged and embodied such that light from the light guide is able to be coupled in the first surface into the light guide element via the input coupling surface and coupled out via the second surface. Thereby, point and line illumination with small dimensions is made available.

DE 10 2012 015 057 A1 discloses a lighting device for a vehicle, comprising a light source and a surface light guide, wherein the light emission of the light source is coupled into the surface light guide via an end face of a surface light guide in the form of a light input coupling surface.

In these lighting devices, only static light effects are possible, i.e. the light source can be used to regulate the brightness between 0 and 100%, wherein the brightness of the light guide, however, always remains constant over the length thereof. In dependence on the light color output by the light source, it is moreover possible to achieve a specific color effect, which is likewise constant over the length of the light guide.

Since high-quality interior illumination represents an essential design feature for a vehicle, there is a desire for the capability of more flexibly designing the interior illumination.

The object of the present invention is to provide a lighting device for a vehicle and an interior design piece which are structurally and/or functionally improved with respect to the solutions known from the prior art.

This object is achieved by way of a lighting device and an interior design piece in accordance with embodiments of the invention.

The invention proposes a lighting device for a vehicle, comprising a light source, a line-shaped light emission element for emitting light that is input into the light emission element by the light source via an input coupling surface of the light emission element, and a light guide element for distributing and/or directing light that is input into the light guide element by the light emission element. The lighting device is characterized in that the light source is line-shaped and arranged so as to extend parallel to the light emission element, with the result that light from the light source is able to be coupled into the input coupling surface into the light emission element at a longitudinal side of the light emission element.

While in the case of the lighting devices known from the prior art, point-shaped light sources provide input coupling of the light at one or two front sides of the light emission element, the lighting device in accordance with the invention makes provision for the light source to have a line-shaped embodiment and for input coupling into the light emission element to be effected laterally at least via a section of the longitudinal extent of the light emission element. It is thus possible to achieve dynamic light-emitting effects using the lighting device according to the invention.

In an expedient embodiment, the light source extends over part of the length or over the entire length of the light emission element. In particular, the light source has a plurality of light-emitting units which are arranged at a distance from one another on a carrier. The light source can be formed for example as what is known as a strip of light-emitting diodes (in short: LED strip). In such an LED strip, light-emitting diodes in chip form are arranged at specified distances on a carrier. It is thus possible to provide over the length of the light emission element a multiplicity of light-emitting units which in each case input light into the light emission element at the longitudinal side of the light emission element.

Expediently, the light-emitting units are individually actuable with respect to their lighting intensity, their switched-on state and/or their light color by a control apparatus. As a result, the lighting device can produce dynamic light, for example a light dot migrating along the light guide element or a migrating light section.

The light source and the light emission element can be arranged on a common carrier element. The electric connection of the light-emitting units to voltage and control lines is effected via the carrier element. It is thus possible to connect the unit of light source and light emission element as one component unit to the light guide element for distributing and/or directing light which is input into the light guide element by the light emission element.

In accordance with a further expedient embodiment, the light emission element has a cross section perpendicular to its longitudinal extent such that the light, provided by the light source, travels a specified minimum distance between the input coupling surface and an output coupling surface. This ensures that in the case of light-emitting units which are capable of outputting light in a plurality of light colors, a mixing to form a desired light color takes place. Such light-emitting units comprise e.g. an RGB chip, i.e. an LED chip which is embodied for outputting red, green and blue light, wherein desired colors can be produced by mixing the individual colors.

It is in particular expedient if the cross section of the light emission element is stripe-shaped, wherein it has a first surface and a second surface, wherein the first surface is one of the two largest surfaces of the light emission element and the second surface is a surface that differs therefrom, wherein the first surface comprises the input coupling surface and the second surface comprises the output coupling surface. That means that the light source and the light emission element are arranged and designed such that light from the light source is able to be coupled into the light emission element via the larger input coupling surface and coupled out via the second, smaller surface. As a result, the installation space of the lighting device can be minimized, because it is possible in accordance with this embodiment for the light source to be arranged laterally with respect to the longitudinal side of the light emission element.

In accordance with a further expedient embodiment, the cross section of the light emission element substantially has the shape of a pentaprism. As a result, the specified minimum length of the light, which is provided by the light source, between the input coupling surface and the output coupling surface, can be effected by multiple deflection in targeted fashion inside the light emission element, as a result of which the space of the lighting device or the unit of light emission element and light source required for the installation space is minimized.

In accordance with a further expedient embodiment, the light source and the light emission element are arranged and designed such that the light is able to be coupled into the light emission element transversely to the longitudinal extent of the light emission element. That means that the light from the light source is able to be coupled into the input coupling surface into the light emission element at the longitudinal side of the light emission element.

Expediently, the light source and the light emission element are arranged and designed such that the direction in which the light is coupled out of the light emission element is substantially transverse to the direction in which the light is coupled into the light emission element. This makes possible a small installation space of the lighting device.

The invention furthermore proposes an interior design piece for a vehicle, which comprises a lighting device. The interior design piece has the same advantages as those that were described previously in connection with the lighting device.

The interior design piece expediently comprises a decorative element.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 3A-3D show various embodiments of light emission elements formed in accordance with the invention.

DETAILED DESCRIPTION OF THE DRAWINGS

Figure 1:
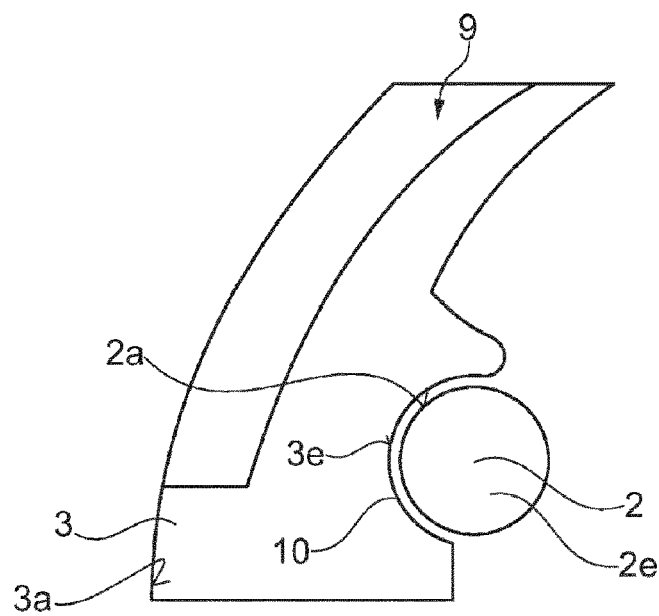
FIG. 1 is a cross section view through a lighting device according to the prior art.

FIG. 1 shows a section through a conventional lighting device for a vehicle, which is used as an interior design piece, e.g. on the inside of the doors, for the vehicle.

The lighting device includes a line-shaped (linear) light emission element 2, a light guide element 3, and a decorative or trim element 9. The light emission element 2, the light guide element 3 and the trim element 9 extend parallel and perpendicular to the drawing plane into the latter. The light emission element 2, which here has a circular diameter merely by way of example, consists of a plastic or glass and is clear or partially transparent. The light emission element 2 is located in a recess of the light guide element 3 that is matched to the cross-sectional shape of the light emission element 2. At one or both end sides of the light emission element 2, a light source is arranged (not illustrated). The light which is input into the light emission element 2 by the light source or light sources, e.g. light-emitting diodes, propagates within the light emission element 2 and exits the light emission element 2 by way of an output coupling surface 2a. Here, the output coupling surface 2a of the light emission element 2 rests against an input coupling surface 3e of the light guide element 3. Within the light guide element 3, made of diffuse material, the light entering it is distributed and directed. The light guide element 3 consists of a diffuse material. Since the trim element 9 is opaque for the light propagating in the light guide element 3, the light exits at the narrow side below the trim element 9. The output coupling surface of the light guide element 3 is marked at that location with the reference sign 3a.

Due to the fact that a respective light source may be provided merely at one or both end faces of the light emission element 2, merely the production of a static light is possible. Static light in this description is understood to mean a lighting device in which the light exiting at the output coupling surface 3a of the light guide element 3 is uniform with respect to light color, light intensity and/or brightness over its entire length (i.e. the extension into the sheet plane).

Figure 2:
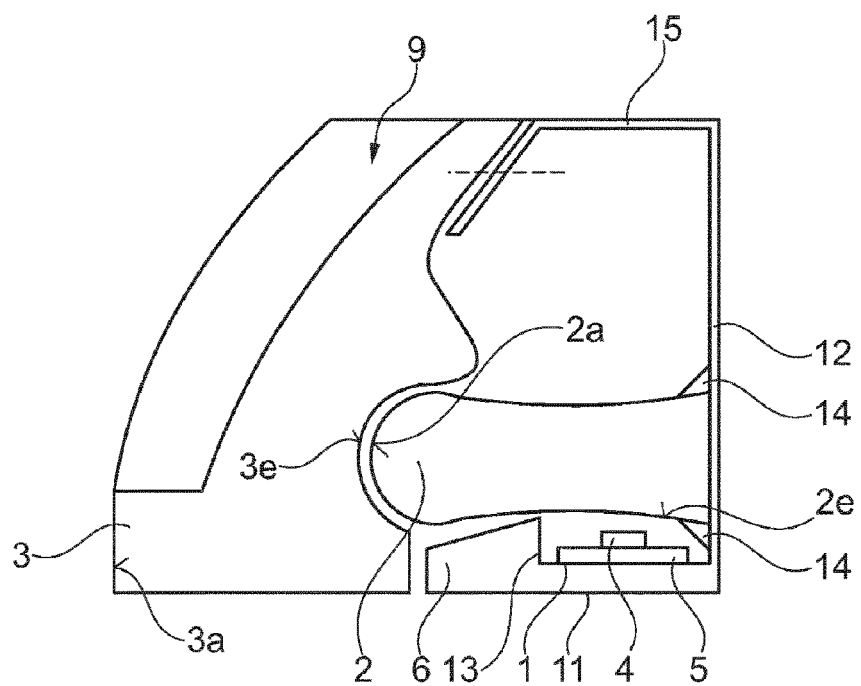
FIG. 2 is a cross section view through a lighting device in accordance with a first embodiment.

By contrast, the lighting device according to the invention shown in FIG. 2 makes possible dynamic light, in which the light color, light intensity and/or brightness can vary in dot-wise or section-wise fashion. With respect to the arrangement shown in FIG. 1, merely the unit of light emission element 2 and light source 1 has been modified. The unit of light source 1 and light emission element 2 will also be referred to below as a light module. The form of the trim element 9 and of the light guide element 3 and, in particular the embodiment of the input coupling surface 3e of the light guide element 3, is unchanged. By exchanging the light module, an interior design piece can thus be provided with dynamic light effects.

As can be seen easily from the cross-sectional representation of FIG. 2, the light is input into the light emission element not at the front sides, but laterally at the longitudinal side thereof. As a result, the light source 1 can have a line-shaped embodiment and be arranged so as to extend parallel to the light emission element 2. In other words, the light source 1, like the light emission element 2, extends into the sheet plane. The light source 1 and the light emission element 2 can have the same length. As a result, light can be coupled into the input coupling surface 2e into the light emission element 2 by the light source 1 over the entire longitudinal side of the light emission element 2. The light is consequently able to be coupled into the light emission element 2 transversely to the longitudinal extent of the light emission element 2.

The light source 1 has a carrier 5, on which a plurality of light-emitting units 4 are arranged. The light-emitting units 4 are arranged with a regular and/or irregular distance from one another on the carrier 5. Such a light source is available as an LED strip. The light-emitting units 4, e.g. in the form of RGB chips, are actuable individually with respect to their light intensity, their switched-on state, their brightness and/or their light color by a control apparatus which is not shown in more detail in the figure. Thereby, the light emission element 2 can be illuminated differently in point-section-wise manner with respect to the lighting intensity, their light color and/or their switched-on state, wherein the light which is radiated into the light guide 2 correspondingly propagates into the light guide element 3. It is thus possible, for example, to let light sections or light dots migrate over the length of the light guide element by correspondingly actuating corresponding light-emitting diodes with respect to their lighting intensity and/or their switched-on state and/or their light color. Such dynamic light effects increase the driving comfort for the driver and the safety. Moreover, greater design freedom is provided.

The light source 1 and the light emission element 2 are arranged on a carrier element 6. The carrier element 6 has two legs 11, 12 which are, merely by way of example, at a right angle with respect to one another. By way of example, the light source 1 is arranged on the first leg 11 of the carrier element 6. To this end, the light source 1 is arranged in a groove 13 of the first leg 11. The second leg 12 has two holding lugs 14, between which and by way of which the light emission element 2 is held. A holding arm 15 of the carrier element 6, which is provided at the end of the second leg 12 that is at a distance from the first leg, establishes a mechanical connection to the light guide element 3.

It should be noted that this setup is merely schematic and serves for illustrating the lighting device according to the invention. The carrier element and the arrangement of the light source and of the light emission element 2 can be correspondingly matched in various ways to the requirements and available space situations.

In the exemplary embodiment shown in FIG. 2, the cross section of the light emission element is stripe-shaped. It has a first surface 7 and a second surface 8 (cf. FIG. 3A), wherein the surface 7 is one of the two largest surfaces of the light emission element 2 and the surface 8 is a surface that differs therefrom. The second, smaller surface 8 here comprises the output coupling surface 2a. The first surface 7 comprises the input coupling surface 2e. As a result, the light source 1 and the light emission element 2 are arranged and designed with respect to one another such that the direction in which the light is coupled out of the light emission element 2 is substantially transverse to the direction in which the light is coupled into the light emission element 2.

The light emission element 2 illustrated in cross section in FIG. 3B exhibits a similar principle. Here, the section which is remote from the output coupling surface 2a has an inclined surface 16 to improve the light deflection in the direction of the output coupling surface 2a. Although the inclined surface in FIG. 3b is illustrated as a plane, it is to be understood that it could also analogously take the form of a curved surface for directing the light.

In the embodiment illustrated in FIG. 3C, the body of the light emission element 2, which is in turn shown in cross section, has a bent design, such that the input coupling surface 2e represents a front side surface. In contrast to the front side surfaces known from the prior art, however, the front side surface 2e is not the narrow side, but a lateral edge which extends over the entire length of the light emission element 2.

The light emission elements illustrated in FIGS. 3A to 3C have a first surface 7 that is significantly longer than the length of the second surface 8. This is because the light input by the light source 1 between the input coupling surface 2e and the output coupling surface 2a must travel a specified minimum length in order to ensure good mixture of the respective colors where the light-emitting units are embodied for outputting colored light.

In the embodiments of the light emission elements 2 illustrated here by way of example, this gives a relatively long structural shape, as a result of which the illumination device also overall requires a greater installation space with respect to the arrangements known from the prior art.

The light emission element shown in cross section in FIG. 3D, however, requires only a small installation space. In cross section, the light emission element 2 has substantially the form of a pentaprism. The lateral edges can here in principle have any desired length, as long as it is ensured that the deflection of the light output by the light source 1 takes place in the schematically illustrated form. The light source 1 is arranged parallel to a surface 24 of the pentaprism. As a result, the light output by the light source 1 is not deflected, or deflected only to a small degree, at the surface 24. By contrast, targeted deflection occurs at the surfaces 21, 22 and 23, with the result that the resulting light ray undergoes a 90° change with respect to the radiation direction of the light source 1. The surface 25 represents the output coupling surface 2a of the light element 2. Due to the multiple targeted deflection, the path required for mixing the colors of the light input by the light source within the pentaprism is ensured. At the same time, only a small installation space is required.

The lighting device according to the invention can be implemented in a simple manner. Existing components, such as the light guide element and the trim element, can continue to be used. Only the exchange of the light emission element and the light source 1, i.e. of the light module, is required in order to be able to turn hitherto static light to dynamic light. This results in a significant cost saving. The production of individual components according to the principle of modularity is furthermore possible.

LIST OF REFERENCE SIGNS 1 light source
2 light emission element
2e input coupling surface of the light emission element 2
2a output coupling surface of the light emission element 2
3 light guide element
3e input coupling surface of the light guide element 3
3a output coupling surface of the light guide element 3
4 light-emitting unit
5 carrier for a plurality of light-emitting units
6 carrier element
7 first surface of the light emission element 2
8 second surface of the light emission element 2
9 trim element
10 receptacle of the light guide element
11 first leg of the carrier element
12 second leg of the carrier element
13 groove for receiving the light source 1
14 holding lug
15 holding arm
21, . . . , 25 surfaces of a pentaprism The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A lighting device for a vehicle, comprising:
a light source;

a line-shaped light emission element for emitting light which is input into the light emission element by the light source via an input coupling surface of the light emission element;

a light guide element for distributing and/or directing light which is input into the light guide element by the light emission element, wherein the light source is line-shaped and arranged so as to extend parallel to the light emission element, such that light from the light source is able to be coupled into the input coupling surface into the light emission element at a longitudinal side of the light emission element, and the light emission element has a cross section perpendicular to the longitudinal extent thereof such that the light, provided by the light source, travels a specified minimum length between the input coupling surface and an output coupling surface.

2. The lighting device as claimed in claim 1, wherein the light source extends over part of the length or the entire length of the light emission element.

3. The lighting device as claimed in claim 1, wherein the light source has a plurality of light-emitting units, which are arranged at a distance from one another on a carrier.

4. The lighting device as claimed in claim 3, wherein the plurality of light-emitting units are individually actuable with respect to their lighting intensity and/or their switched-on state by a control apparatus.

5. The lighting device as claimed in claim 1, wherein the light source and the light emission element are arranged on a common carrier element.

6. The lighting device as claimed in claim 1, wherein the cross section of the light emission element substantially has a pentaprism shape.

7. The lighting device as claimed in claim 1, wherein the light source and the light emission element are arranged and configured such that the light is able to be coupled into the light emission element transversely to the longitudinal extent of the light emission element.

8. The lighting device as claimed in claim 1, wherein the light source and the light emission element are arranged and configured such that a direction in which the light is coupled out of the light emission element is substantially transverse to the direction in which the light is coupled into the light emission element.

9. An interior design piece for a vehicle, comprising a lighting device as claimed in claim 1.

10. The interior design piece as claimed in claim 9, wherein the design piece is a decorative element.

11. A lighting device for a vehicle, comprising:
a light source;
a line-shaped light emission element for emitting light which is input into the light emission element by the light source via an input coupling surface of the light emission element;
a light guide element for distributing and/or directing light which is input into the light guide element by the light emission element, wherein the light source is line-shaped and arranged so as to extend parallel to the light emission element, such that light from the light source is able to be coupled into the input coupling surface into the light emission element at a longitudinal side of the light emission element, a cross section of the light emission element is stripe-shaped, the stripe-shape has a first surface and a second surface, the first surface is the larger surface of the light emission element and the second surface is a surface that differs therefrom, and the first surface comprises the input coupling surface and the second surface comprises an output coupling surface.

12. The lighting device as claimed in claim 11, wherein the light source extends over part of the length or the entire length of the light emission element.

13. The lighting device as claimed in claim 11, wherein the light source has a plurality of light-emitting units, which are arranged at a distance from one another on a carrier.

14. The lighting device as claimed in claim 13, wherein the plurality of light-emitting units are individually actuable with respect to their lighting intensity and/or their switched-on state by a control apparatus.

15. The lighting device as claimed in claim 11, wherein the light source and the light emission element are arranged on a common carrier element.

16. The lighting device as claimed in claim 11, wherein the cross section of the light emission element substantially has a pentaprism shape.

17. The lighting device as claimed in claim 11, wherein the light source and the light emission element are arranged and configured such that the light is able to be coupled into the light emission element transversely to the longitudinal extent of the light emission element.

18. The lighting device as claimed in claim 11, wherein the light source and the light emission element are arranged and configured such that a direction in which the light is coupled out of the light emission element is substantially transverse to the direction in which the light is coupled into the light emission element.

19. An interior design piece for a vehicle, comprising a lighting device as claimed in claim 11.

20. The interior design piece as claimed in claim 19, wherein the design piece is a decorative element.

* * * * *

UNITED STATES PATENT AND TRADEMARK OFFICE
CERTIFICATE OF CORRECTION

| | | |
|---|---|---|
| PATENT NO. | : 11,091,091 B2 | Page 1 of 1 |
| APPLICATION NO. | : 16/152587 | |
| DATED | : August 17, 2021 | |
| INVENTOR(S) | : Peter Schreier | |

It is certified that error appears in the above-identified patent and that said Letters Patent is hereby corrected as shown below:

On the Title Page

Please correct (73) the Assignee name to read -- Bayerische Motoren Werke Aktiengesellschaft --.

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*